June 19, 1956

F. D. MARASSO 2,750,899

COMBINATION DOUGH HANDLING, PROOFING, MOULDING
AND PANNING MACHINE

Filed Dec. 21, 1951

INVENTOR
FRED D. MARASSO
BY
Bradley Cohn
ATTORNEY

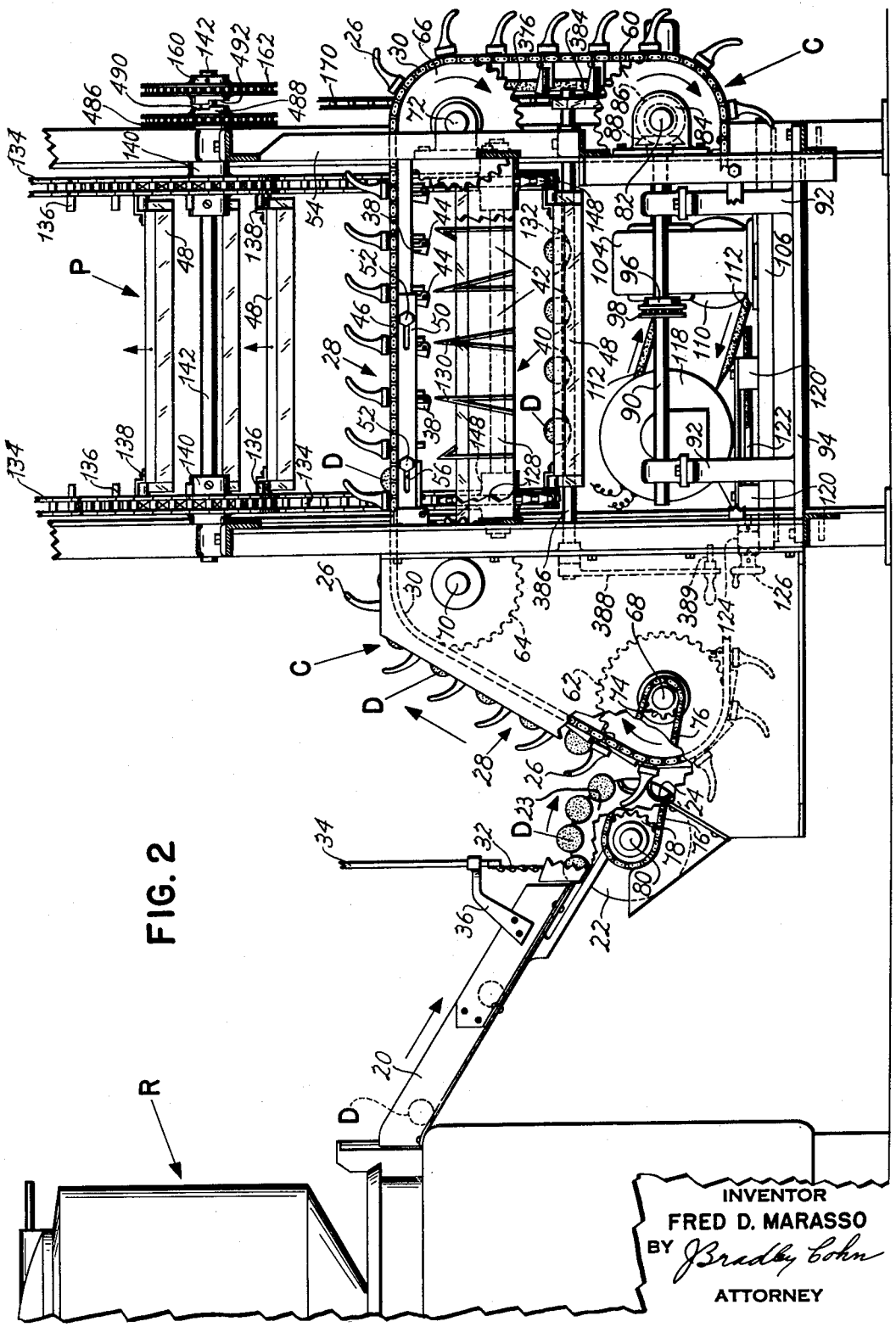

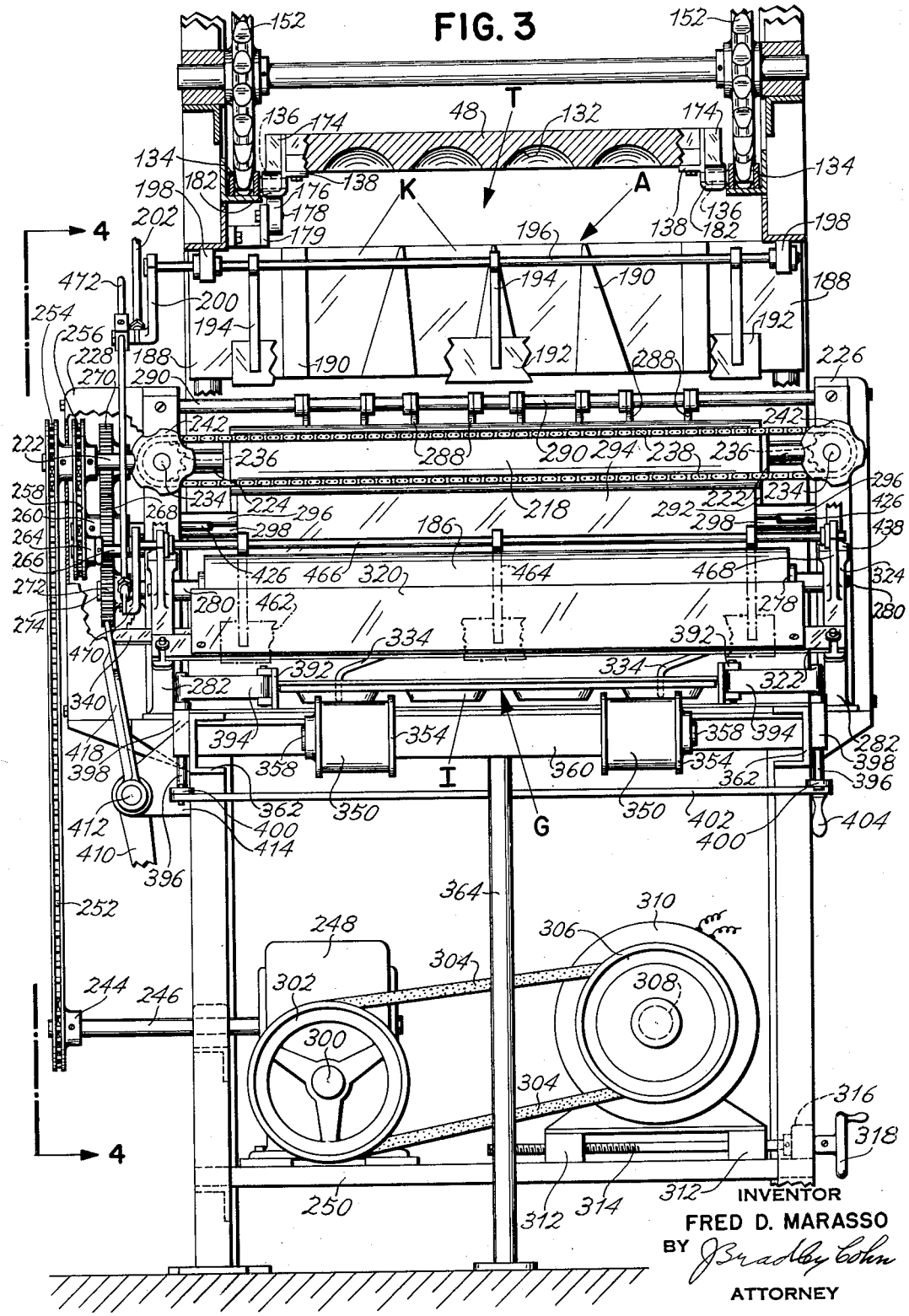

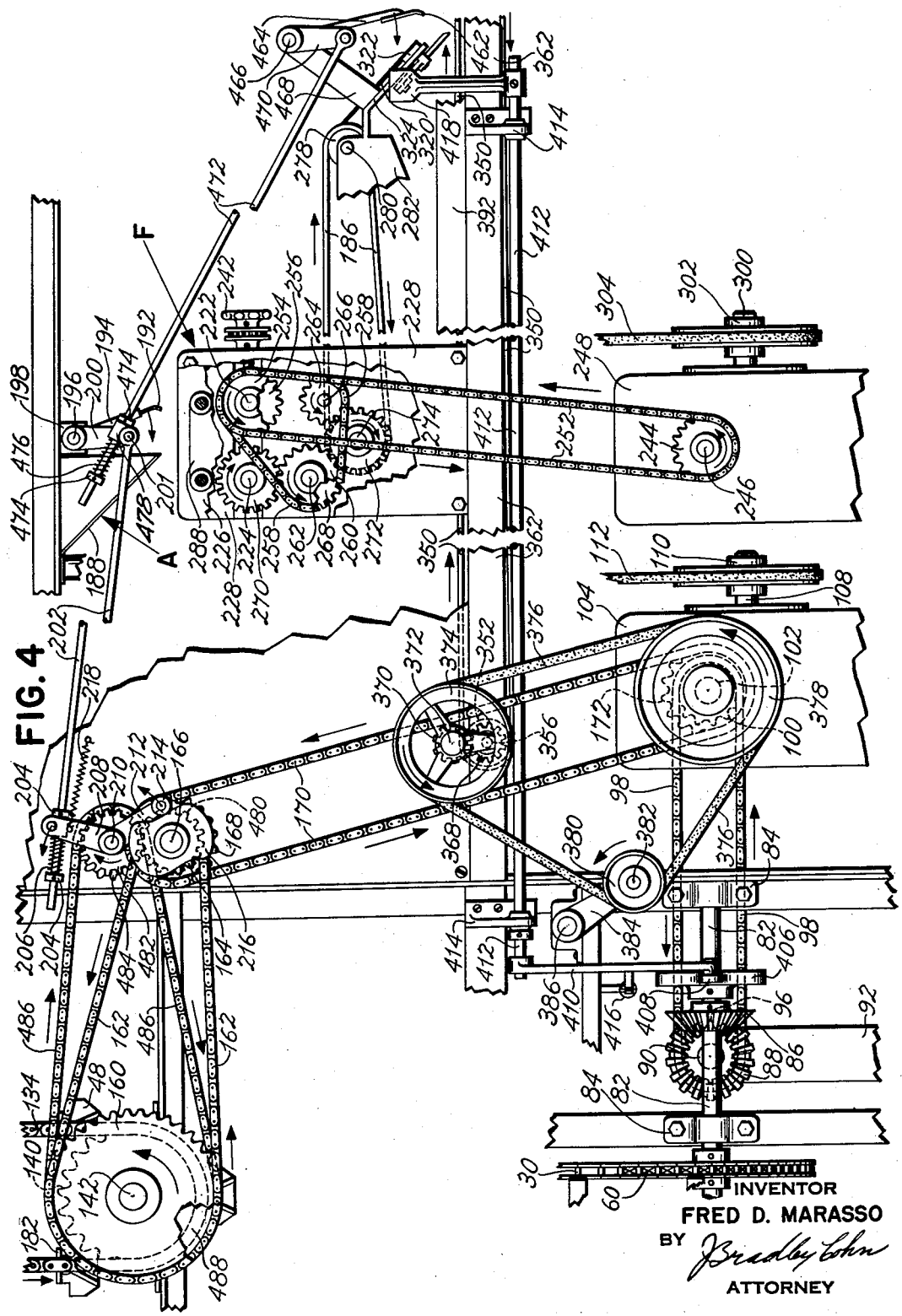

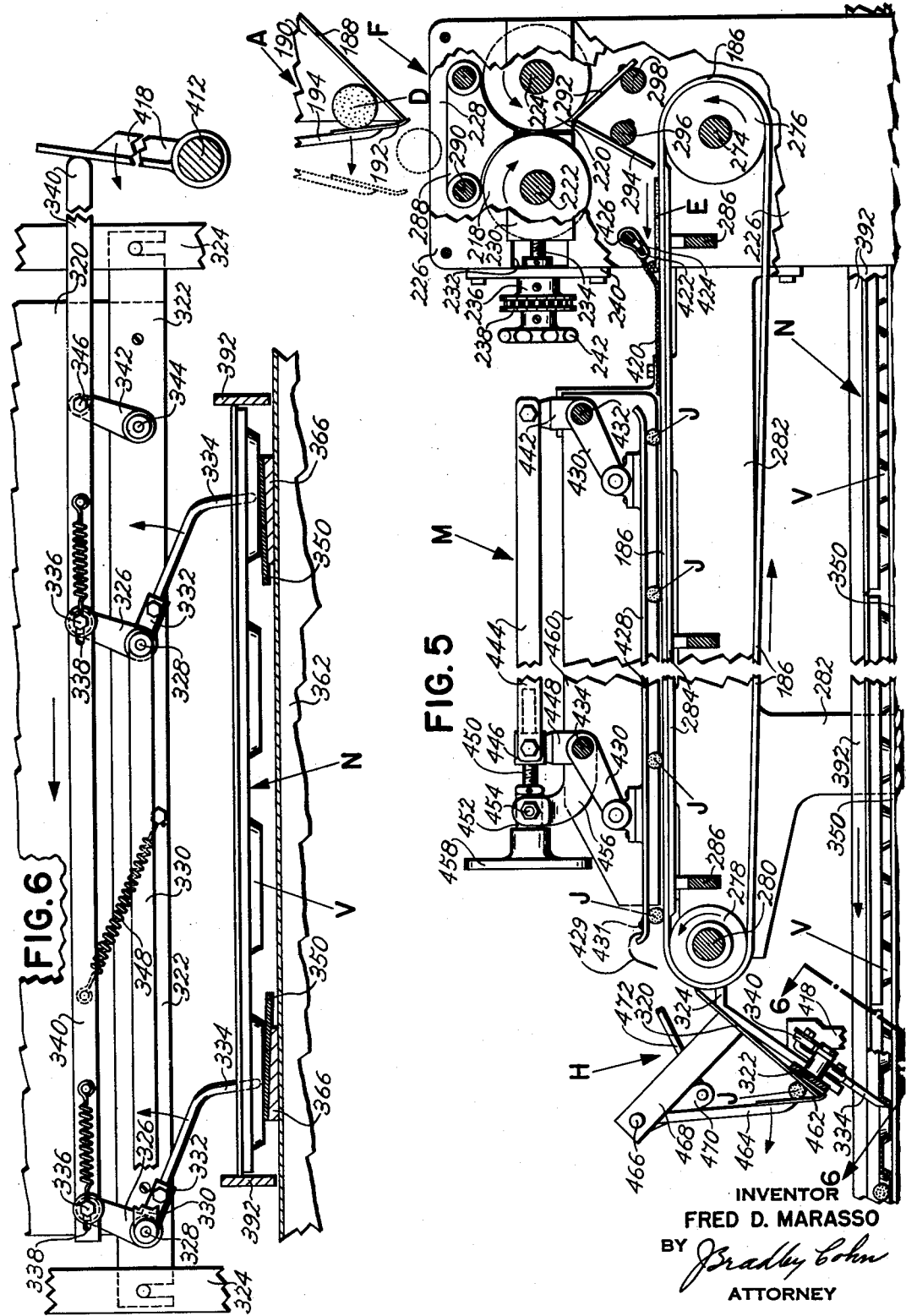

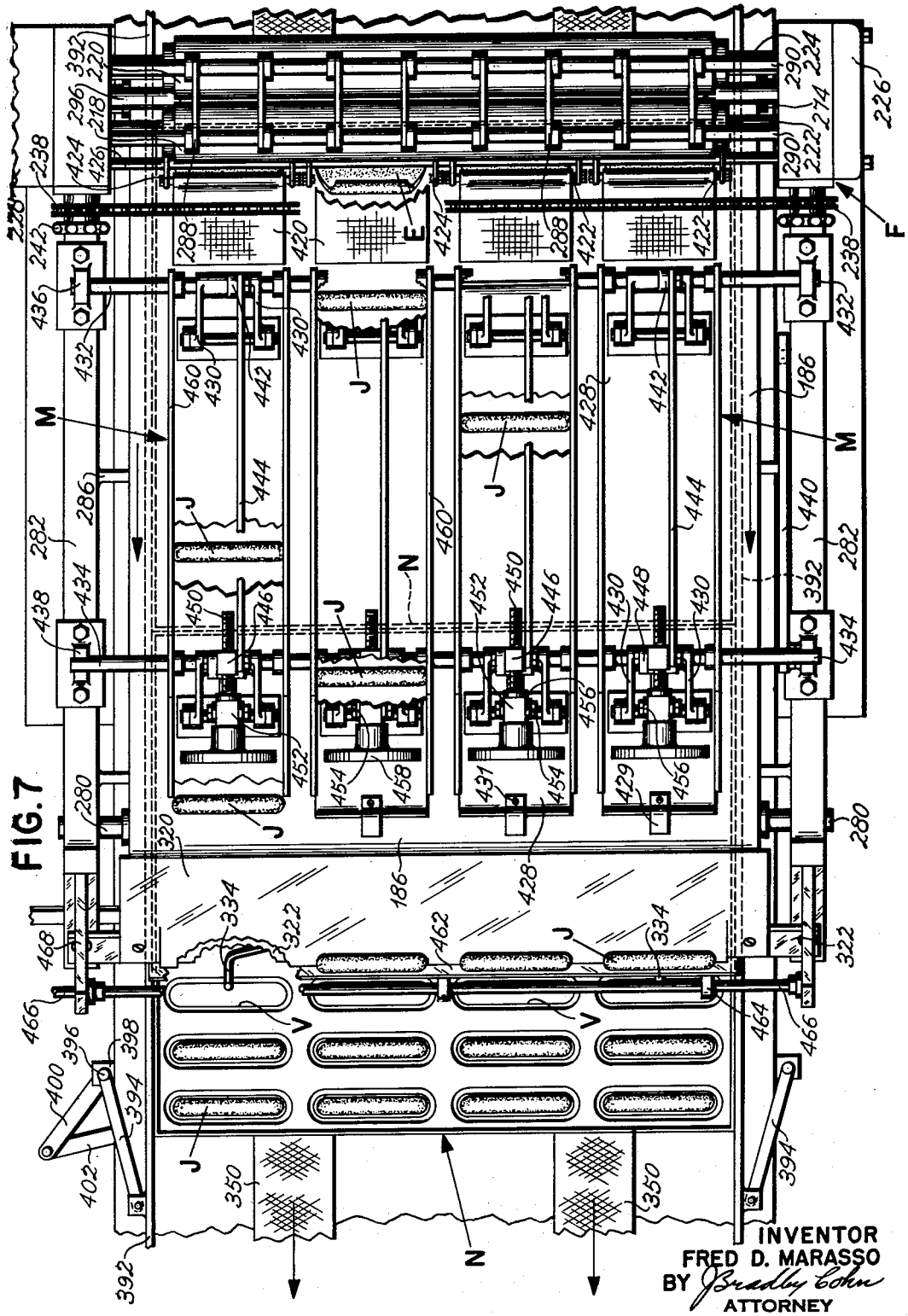

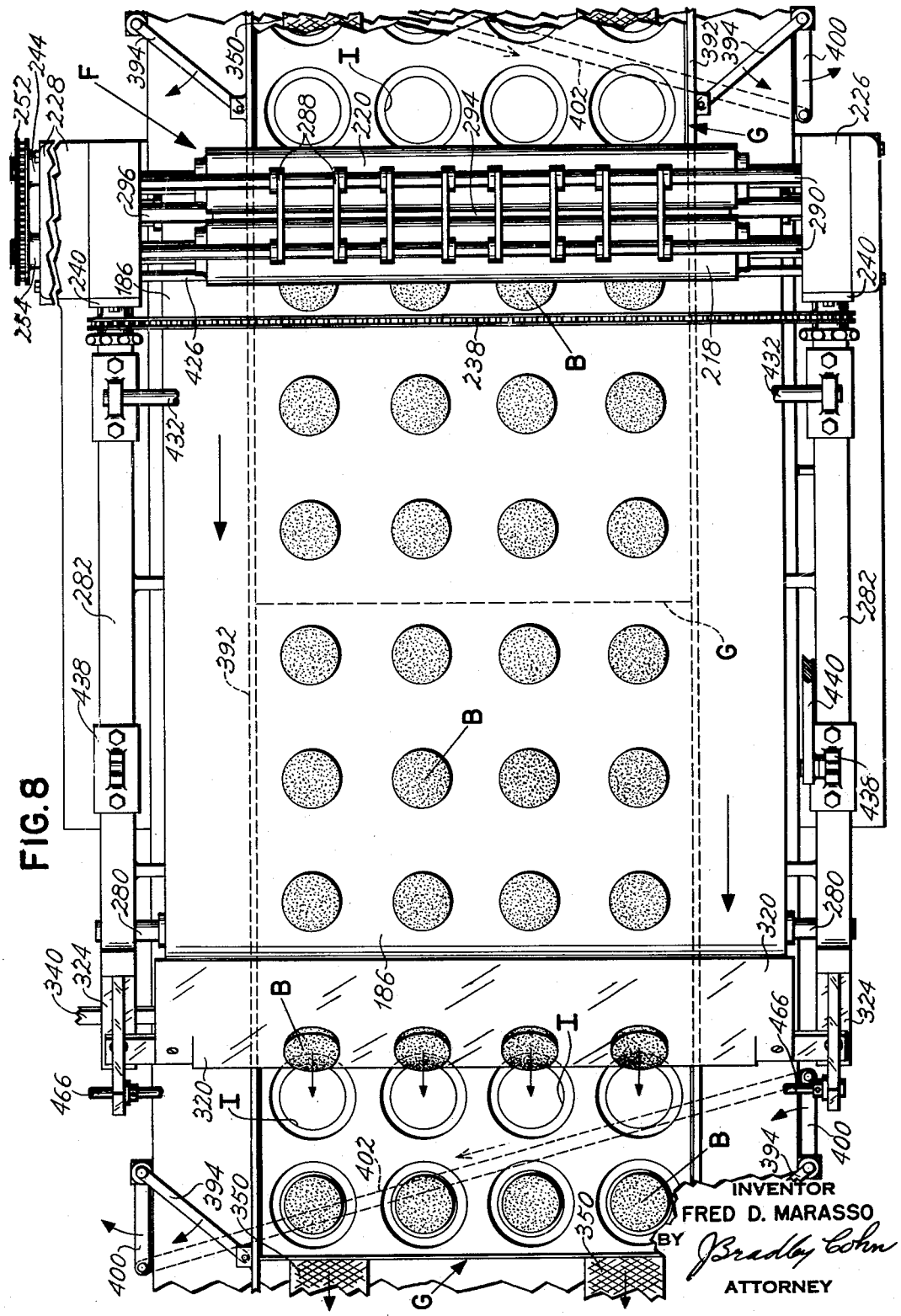

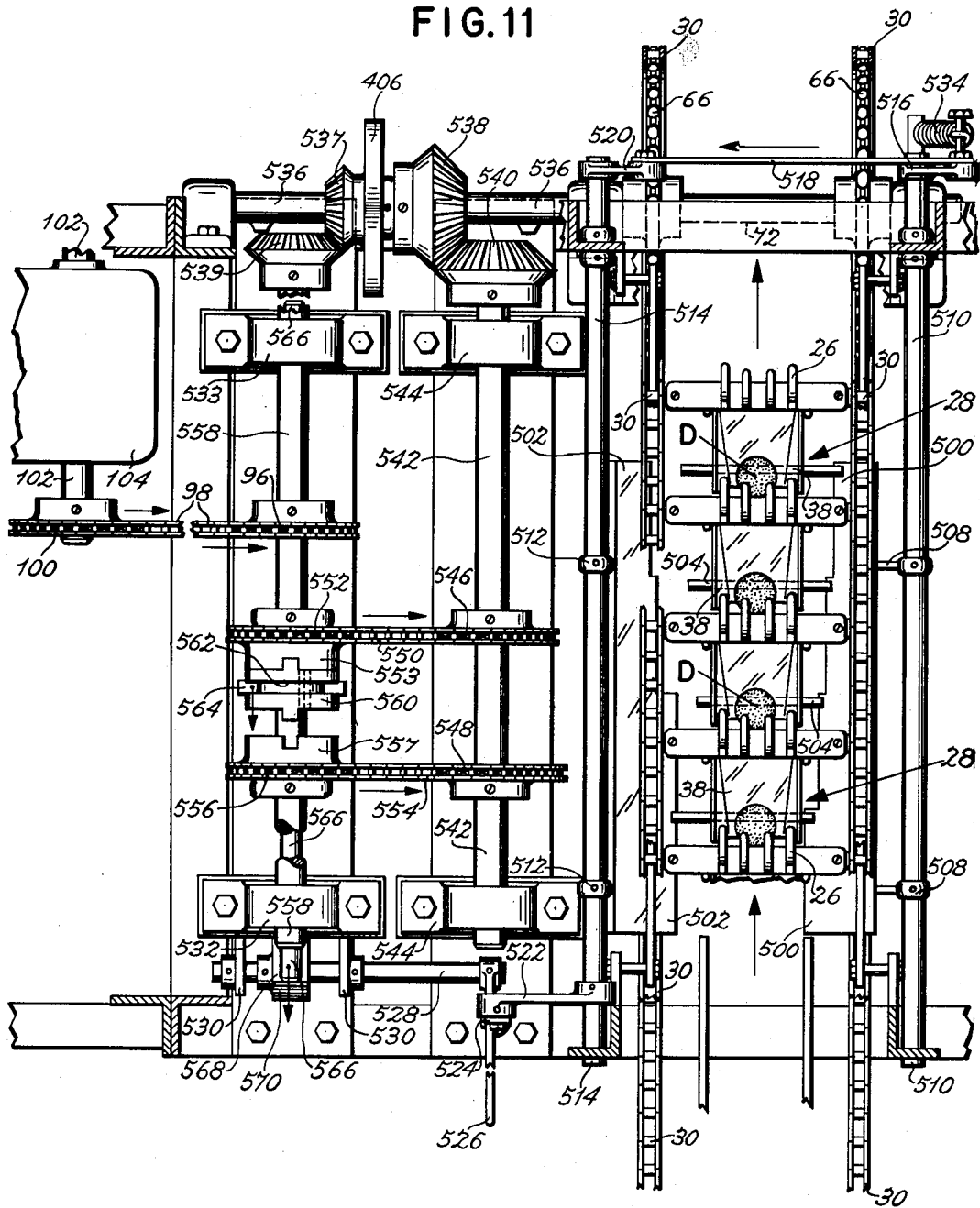

United States Patent Office 2,750,899
Patented June 19, 1956

2,750,899

COMBINATION DOUGH HANDLING, PROOFING, MOULDING, AND PANNING MACHINE

Fred D. Marasso, Joliet, Ill., assignor to Union Machinery Company, a corporation of Illinois Application December 21, 1951, Serial No. 262,744

10 Claims. (Cl. 107—4)

This invention relates to dividing, proofing, sheeting, moulding and panning dough and dough products. Specifically, this invention relates to an apparatus adapted to perform all the operations of proofing, sheeting, moulding and panning dough. In designing a multi-operational machine of this type it is necessary to accurately synchronize the timing for each operation and accommodate one mechanism to another. In order to accomplish the object of my invention, namely a combination machine capable of performing the above-mentioned operations, I have devised new sub-combinations and novel operations in the performance of each of the functions to make it possible to combine the whole. As a result, dough may now pass through one machine from divider to pan without being handled by an operator.

In particular, I have designed a novel cross-feed conveyor to feed dough balls received from a conventional divider to my proofer. I have adapted this novel cross-feed to a novel proofer so constructed and arranged that the dough balls are aligned in the relative position in which they will subsequently be panned. The dough is delivered from the proofer to the sheeter by means of a gated chute timed and operated by the proofer drive to deliver dough balls to the flattening rollers at regulary spaced intervals and in predetermined alignment. The dough pieces then pass along a moulder belt whereon they maintain their alignment and spacing. While on this moulder belt they may be further acted upon, if desired, to form, for example, frankfurter rolls.

Moreover, I have provided a novel method of panning the dough and a novel method of controlling the motion of the pans which automatically positions the indentations of the pans in the proper receiving position regardless of the difference in the spacing between the last indentations or cups of one pan and the first indentations or cups of the following pan. I accomplish this by actually positioning the indentations or cups themselves rather than the pans. This is done by feeding the pan forward on a continually moving endless belt carrier. The forward motion is arrested by fingers engaging the exact indentations that are to be filled. While the pan is so held the endless carrier belt slides beneath the pan. The fingers are withdrawn immediately before the dough piece falls in the pocket of the pan, whereupon the pan moves forward with the belt until the fingers drop into a succeeding indentation or pocket. In this way constancy in cup spacing of different pans is unnecessary. Hence, pans of different size or cup spacing can be used without modifying or regulating the machine. Heretofore, pans have generally been advanced by timed intermittent advancement of the pan carrier itself. This prohibits the use of pans of more than one size and cup spacing.

In the accompanying drawings:

Fig. 2 is a partial end elevation of the machine illustrating the feeding mechanism in conjunction with a dough divider and rounder and a portion of the proofer as seen from the feeding end of the machine;

Fig. 3 is an end elevation partly in section of the machine as seen from the delivery and panning end of the same;

Fig. 4 is a partial side elevation of the machine, taken on line 4—4 of Fig. 3, illustrating the driving mechanism of the same;

Fig. 5 is a sectional side elevation illustrating the arrangement of the sheeting rollers in conjunction with the frankfurter roll moulder and the automatic panner and registering device;

Fig. 6 is a side elevation of the pan registering device as seen from line 6—6 of Fig. 5;

Fig. 7 is a plan view of the sheeting roller arrangement, the frankfurter roll moulder and delivery end of the machine;

Fig. 8 is a plan view illustrating the hamburger roll flattener and panner;

Fig. 11 is a plan view of the modified control and drive mechanism of the feed conveyor taken on line 11—11 of Fig. 9.

Figure 1:
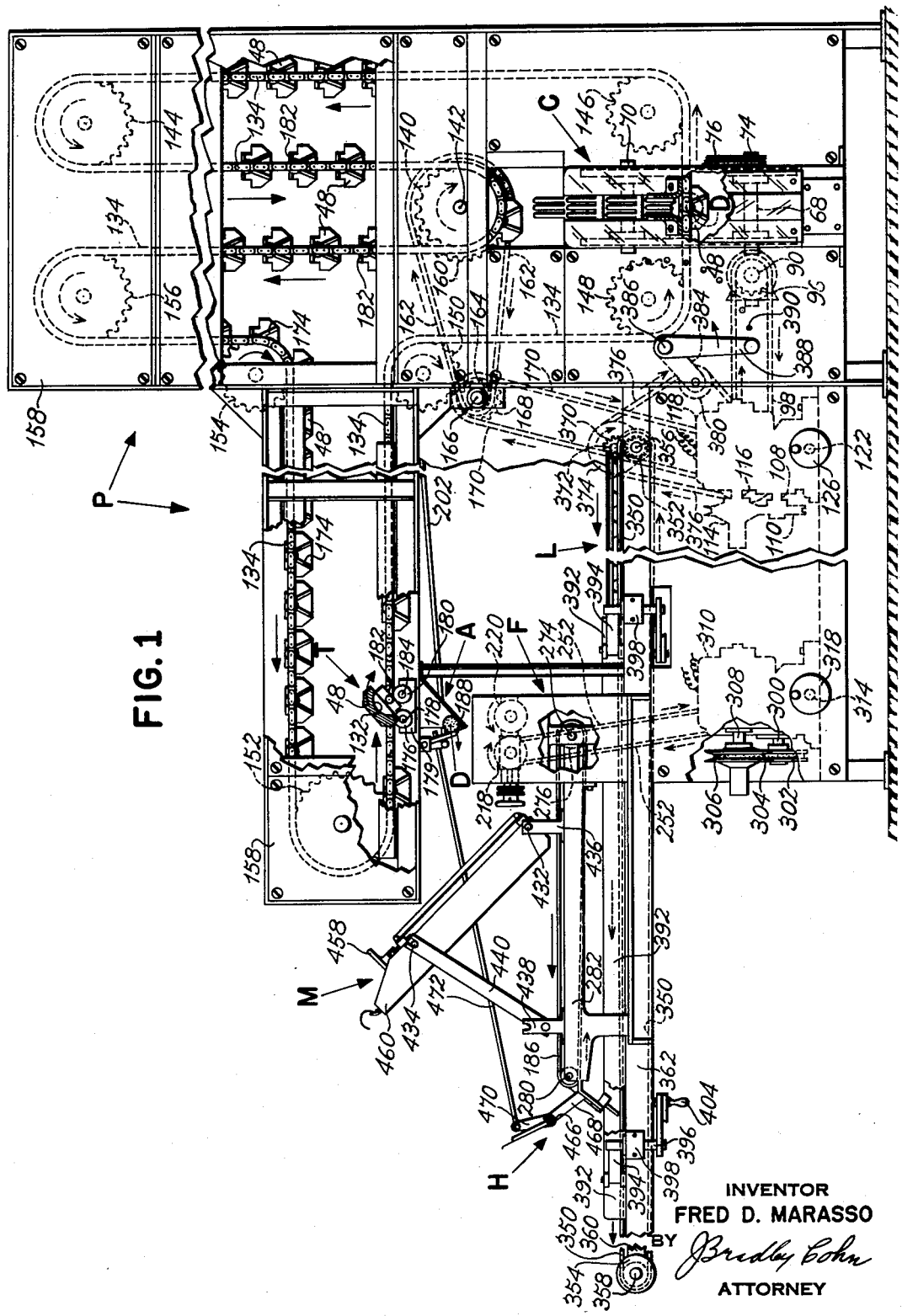
Fig. 1 is a side elevation of the machine illustrating the combined feeding mechanism, proofer, flattener, moulder and panner.

With reference to the drawings, the machine illustrated consists chiefly of a combination of a proofer P, a roll flattener F, a roll moulder M and an automatic panner H (Fig. 1). In order to make it a complete automatic self-sustained unit said machine is also shown in conjunction with an automatic dough dividing and rounding machine R (Fig. 2) which delivers divided and rounded lumps of dough to a synchronized cross-feed conveyor C which forms part of the machine and deposits said lumps of dough into the proofer P mentioned above.

The automatic dough dividing and rounding machine R, of which a portion is shown in Fig. 2, is of well-known design and construction and deposits successively rounded pieces of dough D into an inclined chute 20 leading to a horizontal rotating drum 22 which forms a part of the cross-feed conveyor C and represents the feeding station for the latter. The individual rounded dough pieces D roll down the inclined chute 20 and into pockets 24 formed in drum 22. Since the latter continuously rotates in the direction of the arrow said dough pieces are transported to a position where they are successively removed from said pockets by means of suitably shaped fingers 26 which pass through annular slots or grooves 23 formed in drum 22 to remove the dough pieces D. Fingers 26 project from and form part of individual dough carriers 28, which are attached to and suspended between a pair of spaced endless chains 30 of conveyor C. As each individual dough piece rolls down chute 20 and contacts a pocket 24 in the drum 22, it passes through a vertical chain mesh curtain 32 which is attached to and suspended from an L-shaped holder 34 adjustably held by a suitable bracket 36 secured to one of the side walls of the inclined chute 20. Chain mesh curtain 32 breaks the momentum of the dough pieces at the bottom end of chute 20 and as they enter the individual pockets 24 of drug 22. This chain curtain also acts as a separator for the individual lumps of dough to prevent their piling up on the drum 22. It also wipes excess flour from the dough pieces.

As mentioned above, the cross feed conveyor consists of a pair of spaced endless chains 30 to which are attached a plurality of spaced individual dough carriers 28. The latter are of the same design and construction as the dough carriers illustrated and described in my co-pending application S. N. 207,781, filed January 25, 1951. Each has a row of suitably shaped fingers 26 and a trap door 38.

Carriers 28 pick up the dough pieces D from the pockets of the drum 22 and transport them, first upwardly and then horizontally, to a gate structure 40 where four trap doors 38 simultaneously are released to drop their lumps of dough into respective dough compartments 42 of the gate structure 40. Each door 38 carries a pin 44 which projects sideward from the same and rides on a cam rail (not shown) so that each door is kept closed from where it approaches the drum 22 to the release over a compartment 42. Upon changing from the upward path to the horizontal path the pin 44 rides over an adjustable cam plate 46. Plate 46 is provided with a number of horizontally extending steps, the last of which is formed by the free end of the plate itself. The number of steps corresponds to the number of dough pieces to be deposited simultaneously through the compartments 42 and into a tray 48 of the proofer P. Since in the illustration (Figs. 2, 3, 7 and 8) four pieces of dough are dropped simultaneously the projecting pins 44 of each group of four consecutive dough carriers 28 are arranged in staggered lengths so that the doors of each group or series of dough carriers are maintained in closed positions until the pins 44 reach the end of their respective horizontal supporting step including the end of plate 46, whereby all of the pins of one particular group simultaneously disengage from plate 46, permitting the four doors 38 of said group to swing downward to discharge their respective pieces of dough. The horizontal cam plate 46 is provided with a vertical flange 50 which, by means of screws 52 in horizontal slots 56, is attached to a cross member of the frame 54 of the machine. These slots 56 permit longitudinal adjustment of cam plate 46. Since the entire door controlling mechanisms, including the cam rails and plate, is fully illustrated and described in the aforesaid co-pending application, S. N. 207,781, only an outline thereof is indicated in Fig. 2 of the drawings.

This cross feed conveyor C is driven continuously by means of a pair of driving sprockets 60. The two spaced conveyor chains 30 supporting the dough carriers 28 are led over three pairs of intermediate or guide sprockets 62, 64 and 66 mounted on stud shafts 68, 70 and 72 respectively, all of which are supported in suitable bearing brackets secured to the frame of the machine.

In order to properly synchronize the dough delivering and distributing drum 22 with the cross feed conveyor C at the receiving station of the latter, the stud shaft 68 carries a sprocket 74 which, through chain 76 (Figs. 1 and 2), drives sprocket 78 mounted on shaft 80 (Fig. 2), which supports and to which is secured the dough delivery drum 22. The driving sprockets 60 for the conveyor chains 30 of the cross feed conveyor C are mounted on a horizontal shaft 82 supported by suitable bearing brackets 84 (Figs 2 and 4) attached to up-rights of the main frame of the machine. To shaft 82 is also secured a bevel gear 86 which is driven by a bevel gear 88 mounted on a shaft 90 supported by a pair of bearing brackets 92 extending upwardly from a base plate 94 (Fig. 2) secured to the frame of the machine.

Shaft 90 is driven by means of a sprocket 96 through a chain 98 from a sprocket 100 (Fig. 4) secured to a shaft 102 projecting from a gear reduction unit 104 mounted on base plate 106 rigidly attached to the bottom portion of the frame of the machine. Gear reduction unit 104 is driven by means of a shaft 108 protruding therefrom which carries a pulley 110 which through a V-belt 112 is driven from pulley 114 of motor shaft 116 of motor 118. The motor 118 is mounted on a pair of blocks 120 slidably engaging in suitable tracks (not shown) of the base plate 106 (Fig. 2). One of the blocks 120 is provided with a threaded bore which engages with the threaded portion of a horizontal spindle 122 rotatably secured in suitable bearing lug 124 projecting upwardly from base plate 106. One end of spindle 122 projects outwardly out of the machine and is provided with a hand wheel 126. By turning hand wheel 126 clockwise or anti-clockwise the motor 118 may be moved laterally towards or away from the gear reduction unit 104 and, since pulley 114 is one of the well-known spring-loaded Reeves type split pulleys, the diameter of contact of belt 112 within the pulley will vary as the distance between its center and that of pulley 110 is changed by means of handwheel 126. This provides very desirable speed control of the cross feed conveyor C.

As mentioned heretofore, four rounded pieces of dough are dropped simultaneously by the continuously moving cross feed conveyor through the gate structure 40 into a tray 48 of the proofer P. This gate structure consists of a vertical walled rectangular frame 128 provided with suitable vertical guide and deflector plates 130 dividing said frame in four open guide ducts or compartments 42. Each individual dough piece dropping from the dough carrier of the moving conveyor is properly guided into its respective pocket 132 of the tray 48 of the proofer P. Each tray 48 has four of such evenly spaced pockets 132.

The proofer P consists of a pair of spaced endless chains 134. To one side of each chain is secured a plurality of spaced studs or pins 136 arranged so that the pins of the one chain are aligned with and point toward the pins of the other chain. Each aligned pair of pins pivotally engage with the end plates 138 of a tray 48 so it remains level throughout the course of the endless conveyor. The tray conveyor chains 134 are driven by means of a pair of driving sprockets 140 mounted on a horizontal shaft 142 supported by suitable bearings attached to the main frame of the machine. By leading chains 134 over several pairs of idler or guide sprockets 144, 146, 148, 150, 152, 154 and 156 the tray conveyor makes several vertical as well as horizontal passes through or within the proofer housing 158 to secure the proper proofing time.

On shaft 142 to which the tray conveyor driving sprockets 140 are secured is also mounted a sprocket 160, which through a chain 162 (Figs. 1, 2 and 4), is driven by a sprocket 164 (Fig. 4) rigidly attached to shaft 166. To the latter is secured another sprocket 168 which through a chain 170 is driven by a sprocket 172 mounted on the shaft 102 driven by and protruding from the gear reduction unit 104. Since, as mentioned heretofore, the cross-feed conveyor C through sprocket 100 and chain 98 is driven from the same shaft 102 as the tray conveyor of the proofer, both conveyors always remain synchronized and travel at the same rate of speed. Any change of speed occasioned by manipulation of handwheel 126 is therefore imparted to both conveyors.

Along the lower portion of the horizontal track of the tray conveyor is located a dough discharge station T (Fig. 1) where the conveyor trays 48 are tilted so that the dough pieces D drop from the pockets 132 of the trays and into dough aligning device A. The tilting of a tray 48 takes place when projecting angular lugs or vanes 174 of the end plates 138 contact and engage roller 176 projecting into the path of the vanes at the discharge station T. Roller 176 is pivoted to a stud 178 held by a bracket 179 (Fig. 1) attached to the frame members of the machine. As the vane 174 of the advancing trays 48 passes over stationary roller 176 the tray is tilted and the dough pieces drop out of the pockets.

In order to prevent the dough pieces from occasionally adhering to the pockets the tray is rotated 360° as it passes the discharge station T. This requires a second roller 180 positioned alongside roller 176 (Fig. 1) so that upper flange 182 of vane 174 contacts it before the vane leaves roller 176. The advancing tray 48 is therefore forced to ride upside down across roller 180 and somersault while passing the discharge station T.

After passing roller 180 the trays, of course, swing back to their original horizontal position to proceed to the loading station. The roller 180 is pivotally supported by a stud 184 held by the bracket 179.

As mentioned heretofore, the dough pieces D drop from the tilted conveyor trays at the discharge station T into an aligning device A. The latter serves the dual purpose of properly spacing the four dough pieces dropped therein and also aligning them to properly time their deposit by the device A into the flattener F. Thus, the flattened dough pieces emerge from the flattener to drop onto belt 186 into exact alignment and spaced in accordance with the indentations of the pans to which they are delivered.

Aligning device A consists of an inclined plate 188 (Figs. 1, 3 and 5) to which are secured a plurality of substantially vertical guide members 190 shaped and arranged to form four guide channels K (Fig. 3), the top openings of which are beneath the four pockets 132 of each tray 48, while the bottom openings correspond to the ultimate spacing of the dough pieces on the pans G. The inclined plate 188 extends over the entire width of the machine and is removably attached to the horizontal side frame members of the machine. Across the bottom openings of channels K is located a gate which consists of a plate 192 attached to a plurality of arms 194 secured to horizontal shaft 196 supported at each end in suitable bearings 198 on the horizontal side frame members of the machine. To one end of shaft 196 is secured an actuating arm 200 the free end of which carries a stud 201 to which is pivoted one end of a rod 202 while the other end of the latter through means of a pair of spaced collars 204 and a spring 206 is resiliently connected to an arm 208 (Fig. 4) loosely mounted on a stud shaft 210. From the hub of arm 208 extends a cam lever 212 carrying on its free end a cam roller 214 which engages with a suitably shaped cam 216 mounted on the continuously rotating shaft 166. A tension spring 218 attached to arm 208 and anchored to the housing of the machine keeps roller 214 in engagement with cam 216. When roller 214 rides over the low portion of cam 216 the gate plate 192 is in open position and permits the rounded dough pieces D to drop from the channels of the aligning device A into the flattener F as illustrated in dotted lines in Fig. 5. When roller 214 rides over the high position of cam 216 the gate plate 192 is in closed position and prevents the dough pieces from dropping out of the aligning device A as illustrated in solid lines in Fig. 5. When a tray 48 is tilted and the dough pieces drop into aligning device A the gate plate 192 is closed and remains closed for a short period of time thereafter to align the dough pieces so that they will all drop together to form an even row of flattened pieces when they reach the belt 186. The interval of opening the gate plate 192 is timed to cause a spacing of the rows on the belt 186 that corresponds with the spacing of the rows of indentations I in the pans G.

The flattener F is of well known design and employed for the purpose of flattening the rounded dough pieces into pan-cake-like discs B of a predetermined height. It consists chiefly of two horizontal sheeting rollers 218 and 220 (Figs. 1, 5 and 8) mounted on shafts 222 and 224 respectively. The latter shaft at its ends is supported by suitable stationary bearings in housing 226 and 228 while shaft 222 at each end is journalled in bearings 230 (Fig. 5) which are slidably supported in suitable tracks 232 of housings 226 and 228. Each bearing 230 engages with the threaded portion of a horizontal spindle 234, each of which carries a sprocket 236 both of which are connected by a chain 238. The free ends of both spindles 234 projecting from housings 226 and 228 and supported by bearing plates 240 carry a hand knob 242. The turning of either hand knob 242 on either spindle 234 will effect a simultaneous lateral movement of both bearings 230 by means of which the distance between the two sheeting rollers 218 and 220 and consequently the desired thickness of flattened dough disc B may be controlled to a fine degree. The sheeting rollers 218 and 220 are driven by means of a sprocket 244 (Figs. 3 and 4) mounted on a shaft 246 protruding from a gear reduction unit 248 mounted on a base plate 250 secured to suitable frame members of the machine. Sprocket 244 through chain 252 drives sprocket 254 of shaft 222 of the sheeting roller 218. On shaft 222 is also mounted a sprocket 256 which through a chain 258 (Fig. 4) drives a sprocket 260 secured to a stud shaft 262. Chain 258 is also led over take up idler sprocket 264 loosely mounted on a spring loaded lever (not shown) pivoted in housing 228. To shaft 262 is also secured a gear 268 which meshes with a gear 270 mounted on shaft 224 to which the sheeting roller 220 is secured. Gear 268 also meshes with a gear 272 which is mounted on the end of a horizontal shaft 274 to which is secured a roller 276 which drives the horizontal belt 186 which is also guided over an idler roller 278 mounted on a horizontal shaft 280 journalled in suitable bearings of a frame structure 282. The top portion of the belt 186 is supported by means of a plate 284 (Fig. 5) held by suitable cross members 286 of the frame structure 282. In order to keep their proper spacing and to prevent sidewise movement of the dough pieces when dropping in between the sheeting rollers 218 and 200 a plurality of guides or separator plates 288 (Figs. 3, 5, 7 and 8) are located adjacent to the top of said rollers and are arranged in pairs so that each pair forms a pocket or channel directly in line with the openings of channels K of the aligning device A (Fig. 3). Plates 288 are adjustably supported by and suspended from a pair of parallel rods 290 secured at their end to housings 226 and 228.

The flattener F is also provided with a scraper plate 292 (Fig. 5) and a dough guide plate 294. The latter is secured to a horizontal rod 296 and employed to guide flattened dough pieces from the sheeting rollers onto the horizontal delivery belt 186. The scraper plate 292 is mounted on a horizontal rod 298 to tangentially contact the sheeting roller 220.

As mentioned heretofore, the entire flattener F as well as the horizontal delivery belt 186 is continuously driven by means of the gear reduction unit 248 which in turn is driven by motor 310 through its pulley 306, belt 304, pulley 302 and shaft 300 (Figs. 1 and 3). The motor 310 is mounted on a pair of blocks 312 slidably engaged in suitable tracks (not shown) of the base plate 250 (Fig. 3). One of the blocks 312 is provided with a threaded bore which engages with the threaded portion of a horizontal spindle 314 which is rotatably secured in a suitable bearing lug 316 projecting upwardly from base plate 250. One end of the spindle 314 projects outwardly out of the machine and is provided with a hand wheel 318. By turning the latter clockwise or anti-clockwise the motor 310 may be moved laterally towards or away from the gear reduction unit 248 and since pulley 306 is one of the well known spring loaded Reeves type split pulleys, the diameter of contact of belt 304 will vary as the distance between the center of said Reeves pulley and pulley 302 is changed by means of hand wheel 318, thus providing a variable speed control for the flattener F and horizontal delivery belt 186.

At the end of the delivery belt 186 adjacent to roller 278 is mounted a stationary inclined delivery plate 320 which permits the flattened dough discs B to slide smoothly from the end of the belt into the circular recesses I of the pans G. The inclined plate 320 is secured to a cross bar 322 removably attached at each end to inclined extensions 324 of frame structure 282. The cross bar 322 also carries a pan indexing device which forms part of the automatic panner mentioned heretofore.

The indexing device, illustrated in detail in Figs. 5 and 6, consists of a pair of arms 326 pivoted to studs 328 on cross bar 322. For greater stability the two studs 328 are also connected to each other by means of a horizontal tie bar 330. From the hub of each arm 326 extends a lug 332 to the free end of which is mounted a suitably shaped index finger 334. The free end of each arm 326 carries a stud 336 each of which slidingly engages with one of the slots 338 in horizontal actuating bar 340. These two studs 336 on arms 326 are resiliently held against one end of slots 338 by tension springs (Fig. 6) and actually support said bar 340 in conjunction with a third arm 342 (Fig. 6) which by means of stud 344 is pivoted to bar 322 to support bar 340 at stud 346. A tension spring 348 anchored to the stationary cross bar 322 and attached to actuator bar 340 urges the lower free ends of the index fingers 334 into contact with the pans N (G) passing below. Said pans are placed at the loading station L (Fig. 1) on a continuously running pan conveyor that consists of a pair of spaced endless belts 350 running on driven pulleys 352 and idler pulleys 354. The two driving pulleys 352 are mounted on shaft 356 (Figs. 1 and 4) supported in suitable bearings of the frame structure of the machine. The two idler pulleys 354 are mounted on shaft 358 (Figs. 1 and 3) supported by a suitable bearing bracket 360 secured to a suitable table frame 362 extending horizontally from the frame structure of the machine. The delivery table frame 362 at its extreme end is also supported by means of a suitable leg or post 364 (Fig. 3). The upper run of each conveyor belt 350 is supported by a belt runway plate 366 (Fig. 6). Each plate 366 is slightly narrower than the supported belt and wedge-shaped to incline towards the center of the delivery table 362. This inclination of the runway plates 366 provides even support and good conveyance for uneven or warped pans. Bakery pans frequently have uneven and curved bottoms from the rough handling they receive.

The shaft 356 which carries the two driving pulleys 352 is driven by its gear 368 (Figs. 1 and 4) which meshes with gear 370 mounted on a shaft 372 rotated by its pulley 374. The pulley 374 through a belt 376 is driven by a spring loaded Reeves pulley 378 (Fig. 4) mounted on shaft 102 of the gear reduction unit 104. Belt 376 is guided over an idler pulley 380 which is pivoted on a stud 382 held by the free end of an arm 384 mounted on one end of a cross shaft 386 supported by suitable bearings attached to the frame structure of the machine. The other end of cross shaft 386 protrudes from the opposite side of the machine and carries a handle 388 (Fig. 1). The latter may be set in various positions by means of a conventional spring mounted plunger 389 (Fig. 2) engaging one of the series of holes 390 in the side plate of the machine.

It is self evident that when moving handle 388 upward the pulley 380 on arm 384 will move away from the Reeves pulley 378 to thereby force belt 376 to assume a different diameter of contact within said Reeves pulley and hence a different speed is imparted to pulley 374 which indirectly drives the pan conveyor belts 350. This arrangement is employed to provide means for varying the speed of the pan conveyor, if desired, independently of the speed of the cross feed conveyor C and proofer P, although all are driven from the same source, to wit, gear reduction unit 104.

In order to keep the pans properly aligned on belts 350 from the loading station L to the dough delivery and registering station, a pair of adjustable side guide rails 392 are provided and arranged in such a manner that movement of only one lever will set both guide rails 392 simultaneously to accommodate pans of a greater width. Each guide rail 392 is pivotally attached to and supported at its ends by a pair of arms 394, each of which has an integral vertical stud 396. Each stud 396 is rotatably supported in a suitable bearing bracket 398 secured to the side edges of the delivery table frame 362. To the lower end of each vertical stud is secured another arm 400. The free ends of arms 400 are located opposite (Fig. 8) each other and are connected by a link 420 so that both may be manipulated by handle 404 (Figs. 1 and 3) attached to one of the arms 400 to move the two side guide rails simultaneously towards or away from each other. Since, in this machine, chiefly two types of pans are used, namely pans G for hamburger rolls of a normal width and pans N for frankfurter rolls of a slightly greater width, suitable stop pins (not shown) may be provided to arrest the side guide rails 392 at the proper position for either of the respective pans.

The pan registering device described heretofore is employed for the purpose of stopping the pans momentarily as each row of indentations arrive at the dough delivery station to permit the flattened dough pieces B delivered by belt 186 to slide from the plate 320 into the indentation I (Figs. 5 and 8). To properly synchronize and time this operation with the rest of the machine, this registering device is controlled and actuated by a cam 406 (Fig. 4) mounted on the cross feed conveyor drive shaft 82. Cam 406 engages cam roller 408 pivoted to the free end of cam lever 410 mounted on horizontal shaft 412 supported by suitable bearing brackets 414 attached to the frame structure of the machine. A tension spring 416 is provided to assure a permanent engagement of roller 408 with cam 406. To horizontal shaft 412 is also secured an actuating arm 418 the upper paddle-shaped end of which engages loosely with the rounded end of the horizontal actuating bar 340 (Figs. 3, 4, 5 and 6). As mentioned heretofore, the angularly mounted tension spring 348 connecting the floating bar 340 with the stationary cross bar 322 urges the index fingers 334 into contact with the trays N (G) passing below and the rounded end of bar 340 toward the paddle-shaped end of the actuating arm 418. Therefore, when the cam roller 408 follows a low spot on cam 406 the actuating arm permits the bar 340 to move sideways so fingers 334 contact the bottom of the indentations of the pans; but when roller 408 rides onto a high spot of cam 406 the actuating arm 418 presses against the rounded end of bar 340 and moves it against the pull of spring 348, thereby lifting the fingers 334.

The operation of the pan conveying and indexing is as follows: The conveyor belts 350 continuously feed the pans forward from the loading station L. The index fingers 334 are moved by the action of spring 348 into the lateral indentations V. The pan is arrested by contact from the rear edge or step of the indentations with the fingers 334. When the pan is arrested, the continuously moving conveyor 350 slides beneath the pan. When the gate 462 opens, the fingers are lifted out of the indentations by the action of cam 406 and the linkage above described. In this way, the dough then falls into the roll indentations (just vacated by the fingers 334). The pan moves forward on the continuously moving belts 350 whereupon the fingers drop back to engage the next succeeding row of indentations.

The arresting of said pans at each row of their indentation is timed with the arrival of a row of flattened dough pieces B delivered by belt 186 and sliding from plate 320 into said indentations of the pan. The fingers 334 are only lifted long enough to effect a disengagement from the rear edge of the indentation after which, while the pan resumes movement, each finger contacts the high portion of the pan between the indentations, rides over the latter and drops into the next indentation to arrest said pan again by engaging with the rear edge of said indentation. Since, as mentioned heretofore, each arm 326 which carries an index finger 334 is connected to the actuating bar 340 by means of the stud 336 yieldably held against one end of a slot 338 in said bar, the end of each finger 334 will always be able to contact the bottom surface of its respective indentation although the pan may be uneven or bent out of shape, thus assuring positive arresting action of both fingers at the same time.

While the description above discloses the making of hamburger rolls which consist of round flattened dough pieces, the machine is readily adaptable to produce elongated frankfurter rolls as well. For this purpose, there is provided a row of spaced curling mats 420 (Figs. 5 and 7) and a roll moulder M (Figs. 1, 5 and 7). Each curling mat 420 consists of a square or rectangular piece of wire cloth which at one end is attached to a rod 422 supported at its ends by a pair of suitable loops 424 freely mounted on a horizontal cross bar 426 removably supported in housings 226 and 228 of the flattened device F. Since the machine illustrated produced dough pieces in rows of four, four curling mats in a row are employed. Each mat has its free end resting on the continuously moving delivery belt 186.

In producing frankfurter rolls the sheeting roller 218 by means of turning one of the knobs 242 is brought closer to sheeting roller 220, resulting in a dough disc E of lesser height and greater diameter (Figs. 5 and 7). As the forward edge of each flat dough disc E contacts its respective curling mat 420 the latter curls the disc upon itself into a cylindrical shaped dough piece J. The cylindrical dough piece J then contacts a stationary pressure board 428 of the roll moulder M.

Since the dough pieces arrive in rows of four, four pressure boards 428, arranged parallel to each other, are employed. Each pressure board is pivotally suspended by means of two pairs of arms 430, of which one pair is pivotally mounted on a cross shaft 432, while the other pair is pivotally mounted on a cross shaft 434. The ends of shaft 432 are fulcrumed in suitable bearing brackets 436 (Fig. 1 and 7) secured to the table structure 282. The ends of shaft 434, when the roll moulder M is in operating position, are supported by means of a pair of upright forked brackets 438 also secured to the table frame 282.

The entire moulder M, consisting chiefly of the four pressure boards mentioned above, supported on the two shafts 432 and 434, can be moved upward and out of operating position when making hamburger rolls by lifting the front end upward with supporting shaft 434 by means of a brace 440 (Fig. 1) which at its lower end is pivoted to one end of the forked brackets 438 while its upper free end is provided with an open fork to receive one end of shaft 434. The hub of a pair of arms 430 of each set of arms carrying a pressure board is provided with an upright lug 442 to the upper free end of which is pivoted one end of a link 444. The other end of the latter is pivotally connected to a block 446 which in turn is pivotally attached to the free end of a lug 448 projecting upright from the hub of the second pair of arms 430 of each set of two pairs as mentioned heretofore. Each block 446 is provided with a threaded bore which engages the threaded end of a spindle 450 supported in a bearing block 452. The latter by means of studs 454 is pivotally supported by a forked arm or bracket 456 rigidly secured to cross shaft 434. The free unthreaded end of spindle 450 is provided with a suitable hand wheel 458 which, when turned by the operator, causes block 446 to move horizontally either forward or backward on spindle 450. Since any lateral movement of block 446 is imparted to lug 448 and (through link 444) to lug 442, both pairs of arms 430 are raised or lowered through this movement. Since arms 430 pivotally support the pressure board 428 any raising or lowering of them effects a lowering or raising of the pressure board and thereby decreases or increases the distance or space between the pressure board and the continuously running belt 186, thereby providing fine means to control the diameter of the moulded roll.

As illustrated in Fig. 7, each of the four pressure boards shown is provided with its own independent adjusting device. Besides producing cylindrical dough pieces of uniform diameter it is also desirable that these dough pieces be of uniform length. This is achieved by providing each pressure board with a pair of confining plates 460 running along the side of the board. All four pairs of confining plates 460 are attached in properly spaced relation to shafts 432 and 434. In order to assure that each cylindrical dough piece J after emerging from the pressure board 428 is exactly horizontally aligned, the end of each pressure board is provided with a flat hook or hoop shaped aligning spring 429 (Figs. 5 and 7) movably attached by means of a single screw 431 so that said aligning loop may be moved slightly to the right or left to straighten out dough pieces which might emerge from the pressure board at a slight angle.

To also assure that all four of each row of cylindrical dough pieces J emerging from the pressure boards and delivered by the belt down the plate 320 are deposited into the respective indentation of the pans at the same time during the momentary arrest of said pans, said delivery plate 320 at its lower edge is provided with a timed gate 462 (Figs. 4, 5 and 7). This gate 462 is attached to a plurality of arms 464 all of which are secured to a cross shaft 466 supported at its ends by suitable bearing lugs 468 projecting from the extensions 324 of frame structure 282. To one end of cross shaft 466 is secured an arm 470 to the free end of which is pivoted one end of a rod 472 resiliently connected by means of a pair of spaced collars 474 and a spring 476 to a swivel block 478 pivoted to the stud 201 (Fig. 4) on arm 200 of gate 192 of aligning device A. Therefore, both gates 462 and 192 operate in synchronism. However, gate 462 need only be used when producing frankfurter rolls. For hamburger rolls the gate 462 due to yielding connection or rod 472 to arm 200 may be swung upward and out of the way as illustrated in Fig. 1. In this position said gate rocks back and forth, but performs no function.

Since the pans N (Fig. 7) used for frankfurter rolls are much wider than the pans G (Fig. 8) used for hamburger rolls, and since the spacings between the centers of the identations V of each row of pans N are larger than the spacings between the centers of the indentations I of each row of pans G, the following changes are necessary to convert from hamburger rolls to frankfurter rolls.

(1) The inclined plate 188 carrying the vertical guide members 190 (Fig. 3) of the aligning device A is removed and replaced with a similar plate carrying similar guide members which are arranged with spacings corresponding to the spacings of the centers of indentation on the frankfurter roll pans N.

(2) The separator plates 288 adjacent the top of the sheeting rollers of the flattening device F are moved along parallel rods 290 and set in place to align with the replaced plate 188 and guide members 190.

(3) Either one of the hand knobs 242 is turned in the proper direction to bring sheeting roller 218 closer to roller 220 to produce a thinner dough disc adapted for curling.

(4) Rod 426 to which the four curling mats 420 are attached is hung in place.

(5) The roll moulder M, which was up in inoperative position during hamburger roll production, is lowered by removal of bracket 440 to operative horizontal position.

(6) The inclined delivery plate 320 which is attached to cross bar 322 (Fig. 6) carrying the pan indexing device is removed and replaced by a similar unit in which the lateral spacing of the index fingers 334 corresponds with the respective indentations of the frankfurter pans.

(7) The delivery gate 462 is swung from the upper inoperative position to the lower operative position.

(8) Lastly, the guide rails 392 of the pan conveyor are moved outwardly by the handle 404 to accommodate the wider frankfurter pans.

If it should become necessary to slightly vary the speed between the various units, manipulation of hand wheel 318, hand wheel 126 and/or handle 388 will synchronize the speeds as desired.

In case the rounded dough balls D delivered from the cross feed conveyor C to proofer trays 48 require little or no proofing time, the direction of travel of the proofer conveyor is reversible to permit the dough balls to be carried the short distance from the dough receiving station to the dough discharge station without passing through the proofer.

This is done by a gear 480 (Fig. 4) mounted on shaft 166 to drive gear 482 loosely mounted on stud shaft 210. Integral with gear 482 is a sprocket 484 which through a chain 486 drives a sprocket 488 (Figs. 2 and 4) freely turning on the conveyor drive shaft 142. The hub of sprocket 488 is provided with a conventional one-tooth clutch face 490 (Fig. 2) adapted to engage with a corresponding clutch face 492 of the hub of sprocket 160 mounted on shaft 142. During normal operation as shown in Fig. 2 the clutch faces of sprocket 160 and 488 are separated and the conveyor shaft is driven via the chain 162 by sprocket 160. Sprocket 488 simply turns freely on shaft 142 in the opposite direction.

If it is desired to drive the proofer conveyor in the opposite direction the chain 162 is removed and the sprocket 488 is shifted close to sprocket 160 so that the clutch faces 490 and 492 engage which, naturally, causes sprocket 160 on shaft 142 to be driven by sprocket 488 in the direction opposite to that driven before by chain 162.

Figure 9:
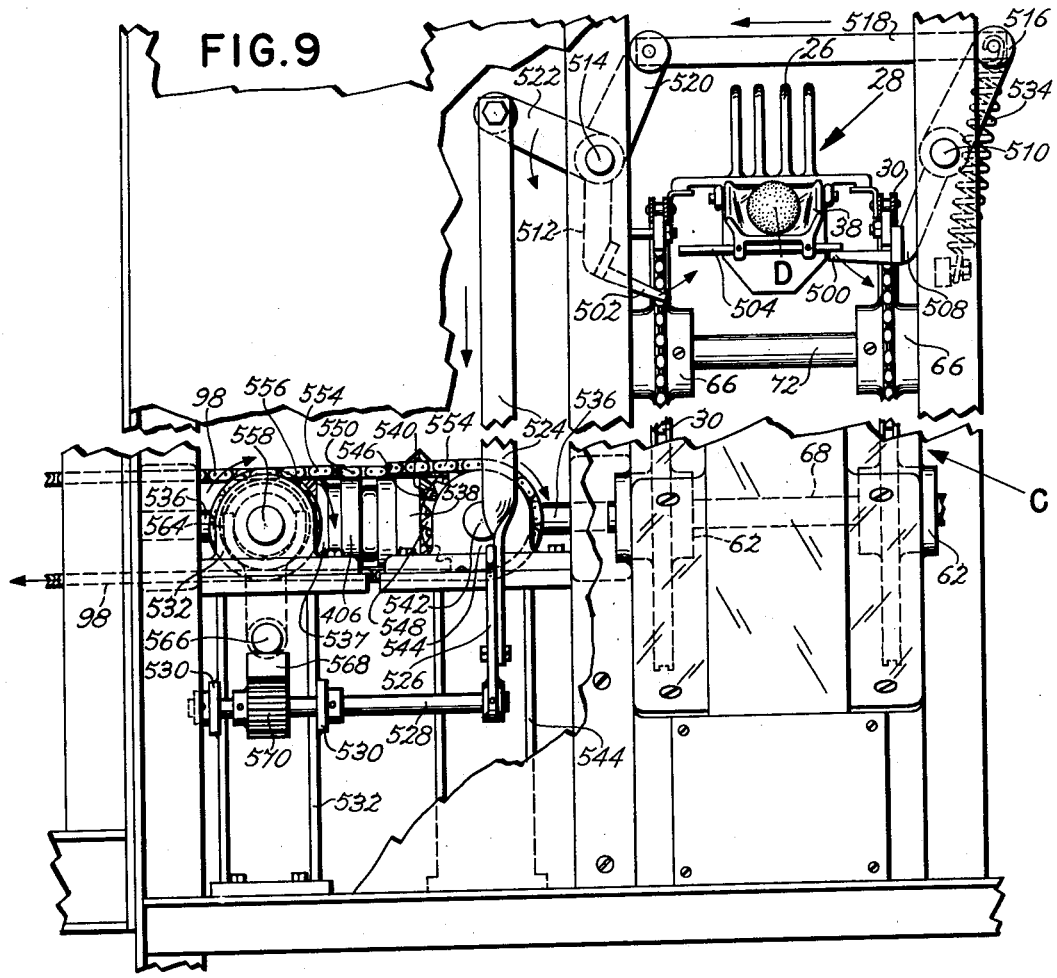
Fig. 9 is a partial side elevation of the machine illustrating a modified control and driving mechanism of the feed conveyor.
Figure 10:
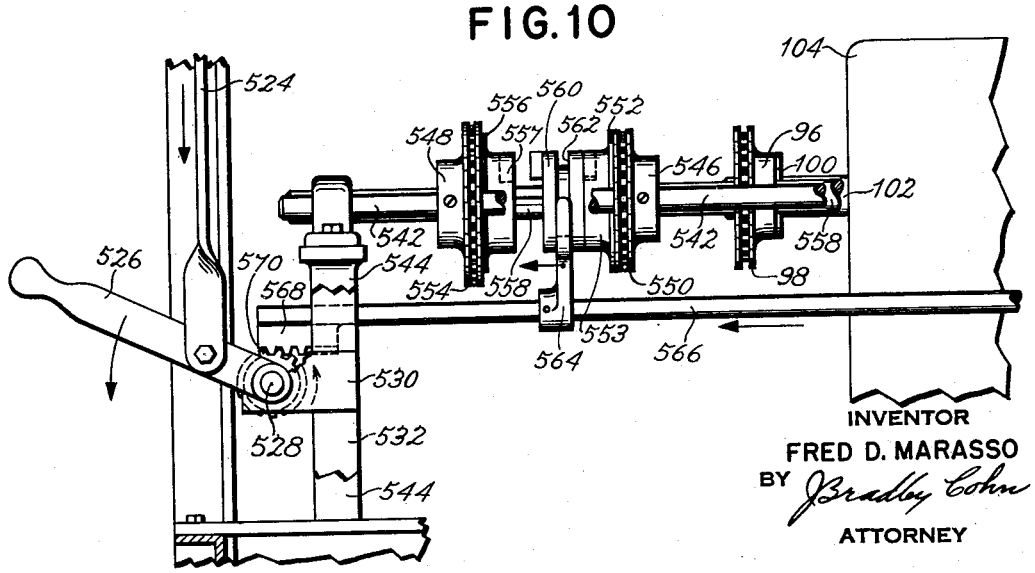
Fig. 10 is a partial end elevation of the modified drive control mechanism.

As mentioned heretofore, the machine is so designed and arranged that four rounded dough pieces D are dropped simultaneously in each of the proofer trays 48. However, it may be desirable to deliver the dough pieces to the pan in rows of a different number, such as three, instead of in rows of four as shown. Figs. 9, 10 and 11 illustrate a modified construction which permits changing the number of rows delivered. The embodiment illustrated shows means for delivering three or four rows as desired.

Since the individual rounded dough pieces D are conveyed by the individual dough carriers 28 of the cross feed conveyor, the modified design incorporates one laterally stepped cam plate 500 with four steps and one laterally stepped cam plate 502 with three steps. It is understood that the machine could have any other desired number of steps in either cam. Said cam plates are arranged and connected to each other in such a manner that when one plate is moved into operating position the other one swings into an inoperative position (Figs. 9 and 11). As mentioned in the preferred form of the construction, the hinged doors 38 of the dough carriers 28 which carry the dough pieces are controlled by horizontally staggered projecting pins 44 riding over the horizontally stepped cam plate. In the modified construction, the hinged doors 38 are provided with similar pins 504 projecting from both sides of the doors but their ends staggered on one side of the doors in groups of four different lengths and on the opposite side in groups of three different lengths (Fig. 11).

It is, of course, understood that the four step and three step cam plates 500 and 502 are located adjacent the side of the staggered group of eqivualent number, so that the doors of four successive dough carriers open simultaneously when the four step cam plate is in operating position and the doors of three successive dough carriers open when the three step cam plate in operating position. The simultaneous opening of four or three doors, of course, means that four or three dough pieces are dropped simultaneously into a proofer tray passing beneath. If only three dough pieces are dropped in each proofer tray one of the pockets 132 of each tray remains empty and the dough pieces at the delivery end of the machine emerge in rows of three.

The four step cam plate 500 is supported by a plurality of arms 508 all of which are secured to a horizontal shaft 510 fulcrumed in suitable bearings of the frame structure. The three step cam plate 502 is supported by a plurality of arms 512 all of which are secured to a horizontal shaft 514 also fulcrumed in suitable bearings of the frame structure. To one end of shaft 510 is secured an arm 516 which, by means of a link 518, is connected to an arm 520 mounted on shaft 514. To the latter is also secured another arm 522 which, by means of a link 524, is connected to a hand or control lever 526 mounted on a horizontal shaft 528 supported in suitable bearing lugs 530 attached to a bracket 532.

It is readily apparent from the drawings that if lever 526 is moved upward the four step cam plate 500 is brought into operating position and the three step cam plate 502 is moved out of the path of the projecting pins 504 into an inoperative position. When moving lever 526 downward the three step cam plate 502 is brought into operating position and the four step cam plate is moved out of the path of the projecting pins into an inoperative position. A toggle spring 534 (Figs. 9 and 11) anchored on one end to the frame structure and hooked on the other end to arm 516 assures the proper arrest of cam plates 500 and 502 in either position.

In the modified design the cross feed conveyor driving sprockets 60 which drive the conveyor chains 30 are mounted on a shaft 536 to which is secured a bevel gear 583 (Fig. 11) driven by a bevel gear 540 fastened to a shaft 542. The latter is supported by suitable bearing brackets 544 attached to the frame structure of the machine. To shaft 542 are also secured two sprockets 546 and 548 which are of different diameters. Sprocket 546 by means of a chain 550 is connected to a sprocket 552, while sprocket 548 by means of a chain 554 is connected to a sprocket 556. Sprockets 552 and 556 are loosely mounted on shaft 558 which corresponds to shaft 90 of the driving mechanism illustrated in the preferred form (Fig. 4). Said shaft, as mentioned heretofore, is continuously driven through the sprocket 96 connected by the chain 98 to the sprocket 100 mounted on the shaft 102 protruding from gear reduction unit 104. To shaft 558 is slidably keyed a clutch member 560 located between the spaced hubs 553 and 557 of the sprockets 552 and 556 respectively. Each of said hubs is provided with a conventional female clutch face while the clutch member 560 is provided with two conventional male clutch faces. Said clutch member 560 is also provided with an annular groove 562 which engages with the forked end of a clutch actuating arm 564 secured to a shaft 566 (Fig. 10). The latter is slidably supported in suitable bushings (not shown) of bearing brackets 532 and 533 which are also employed to support shaft 558. To one end of shaft 566 is also secured a gear rack 568 which engages with a gear 560 mounted on shaft 528.

Since, as mentioned heretofore, control lever 526 is also secured to shaft 528 and the movement of said lever effects the positioning of the stepped cam plates 500 and 502, it is evident from the above description and illustration in Figs. 9, 10 and 11 that an up or down movement of lever 526 also causes a lateral shift of clutch member 560 which in turn effects an engagement with clutch face of either hub 553 or 557. Therefore, when lever 526 is in its upper position the four step cam plate 500 is in operating position and clutch member 560 is in engagement with hub 553 of sprocket 552 and imparts its driving rotation through sprocket 552, chain 550 and sprocket 546 to shaft 542 which through the aforementioned connections drives the cross feed conveyor chains 30 which carries the dough carriers 28.

As mentioned before, the speed of conveyor chains 30 is timed and synchronized to drop four rounded dough pieces D simultaneously into a tray 48 of the proofer conveyor as it passes beneath the dough carriers 28. However, when lever 526 is moved to its downward position the three step cam plate swings into operating position to drop only three dough pieces D into each conveyor tray. With lever 526 in its downward position the clutch member 560 engages the hub 557 of sprocket 556. Driving to shaft 542 is then through sprocket 556, chain 554 and sprocket 548. The diameter of sprocket 548 is slightly larger than that of sprocket 546 to provide greater reduction in the speed of the cross feed conveyor chain 30.

It is necessary to reduce the speed of the cross feed conveyor so that the speed of the proofer conveyor (and the proofing time) remain constant. Of course, it is further apparent that the relative speed of these two conveyors would be different where the cross feed conveyor is feeding three rather than four dough pieces at a time.

The modified design disclosed in Figs. 9, 10 and 11 accordingly incorporates the speed change between the two conveyors that operates automatically from the cam sector 526. Referring to Fig. 11, the cam 406 which operates the indexing mechanism as shown in Fig. 4 of the preferred design is loosely mounted on shaft 536. The bevel gear 537 integral with cam 406 is continuously rotated at a constant speed by bevel gear 539 mounted on a continuously driven shaft 558, which, of course, operates directly with sprocket 100 of the gear reduction unit 104.

It will be understood that my invention is not limited to the embodiments herein disclosed and that the terminology employed is for purposes of description and not limitation. Applicant, therefore, does not wish to be limited beyond the scope of the appended claims.

I claim:

1. In combination with a dough proofer, flattener and panner for receiving dough lumps from a divider, proofing them, sheeting them, moulding them and panning them in pans of the type having individual pockets, of a drum having spaced peripheral pockets for receiving lumps of dough from the divider, an endless chain cross feed conveyor having movable dough supporting members to receive dough lumps from said drum, said members being movable from a dough supporting position to a dough releasing position, said proofer including a second chain conveyor having at least one run runnings at right angles to and below said first-named conveyor, said second conveyor having two substantially co-extensive parallel spaced endless chains and dough supporting trays suspended between said chains, means to simultaneously move a plurality of dough supporting members of said first-named conveyor to releasing position as they pass over the trays of the second conveyor, said dough proofer including a proofing chamber through which passes at least one run of said secondary conveyor, trip means for dumping the trays of the secondary conveyor at a predetermined station subsequent to their passing through the proofing chamber, an elongated trough-like structure to receive a plurality of dough lumps dumped at said station to support and deliver them in linear arrangement, said flattener including at least one pair of continuously driven sheeting rollers positioned at said trough-like structure, means for moulding the flattened dough lumps including a horizontal dough conveyor belt positioned beneath said sheeting rollers to receive flattened dough lumps therefrom, a chain skirt draping said last-named conveyor to roll flattened dough lumps, and a moulder foot positioned at a predetermined distance above and parallel to the conveyor belt to shape the rolled dough lumps, a second trough located at the discharge end of said dough conveyor belt to receive and re-align the rolled dough lumps, a gate on each of said troughs to release the contents, drive means on said proofer conveyor, means operated from said drive means for opening said gates at regular timed intervals corresponding to the time required to advance said proofer conveyor the distance of the center to center distance between the dough supporting members thereon, said panner including a continuously driven endless pan conveyor belt positioned to pass beneath said last-named trough and adapted to support pans of the type having individual pockets positioned on said continuously moving pan conveyor belt, and fingers mounted adjacent said last-named trough and adapted to engage the pockets of such pans and to move into a disengaging position, and means operated from and therefore timed with the driven means of said proofer conveyor and said gate opening means to move said fingers into and out of engaging position in timed relation to the opening of said gates.

2. In combination with a dough proofer, flattener and panner for receiving dough lumps from a divider, proofing them, flattening them, sheeting them and panning them, in pans of the type having individual pockets, of a drum having spaced peripheral pockets for receiving lumps of dough from a divider, an endless chain cross feed conveyor having movable dough supporting members to receive dough lumps from said drum, said members being movable from a dough supporting position to a dough releasing position, said proofer including a second chain conveyor having at least one run running at right angles to and below said first-named conveyor, said second conveyor having two substantially co-extensive parallel spaced endless chains and dough supporting trays suspended between said chains, means to simultaneously move a plurality of dough supporting members of said first-named conveyor to releasing position as they pass over the trays of the second conveyor, trip means for dumping the trays of the secondary conveyor at a predetermined station, an elongated trough-like structure to receive a plurality of dough lumps dumped at said station to support and deliver them in linear arrangement, said flattener including at least one pair of continuously driven sheeting rollers positioned at said trough-like structure, means for moulding the flattened dough lumps including a horizontal dough conveyor belt positioned beneath said sheeting rollers to receive flattened dough lumps therefrom, a second trough located at the discharge end of said dough conveyor belt to receive and re-align the rolled dough lumps, a gate on each of said troughs to release the contents, drive means on said proofer conveyor, and means operated from said drive means for opening said gates at regular timed intervals corresponding to the time required to advance said proofer conveyor the distance of the center to center distance between the dough supporting members thereon in timed relation to the opening of said gates.

3. In combination with a dough proofer, flattener and panner for receiving dough lumps from a divider, proofing them, flattening them, sheeting them and panning them in pans of the type having individual pockets, of a drum having spaced peripheral pockets for receiving lumps of dough from a divider, an endless chain cross feed conveyor having movable dough supporting members to receive dough lumps from said drum, said members being movable from a dough supporting position to a dough releasing position, said proofer including a second chain conveyor having at least one run running at right angles to and below said first-named conveyor, said second conveyor having two substantially co-extensive parallel spaced endless chains and dough supporting trays suspended between said chains, means to simultaneously move a plurality of dough supporting members of said first-named conveyor to releasing position as they pass over the trays of the second conveyor, said dough proofer including a proofing chamber through which passes at least one run of said secondary conveyor, trip means for dumping the trays of the secondary conveyor at a predetermined station subsequent to their passing through the proofing chamber, an elongated trough-like structure to receive a plurality of dough lumps dumped at said station to support and deliver them in linear arrangement, said flattener including at least one pair of continuously driven sheeting rollers positioned at said trough-like structure, a horizontal dough conveyor belt positioned beneath said sheeting rollers to receive flattened dough lumps therefrom, a second trough located at the discharge end of said dough conveyor belt to receive and re-align the flattened dough lumps, a gate on each of said troughs to release the contents, drive means on said proofer conveyor, and means operated from said drive means for opening said gates at regular timed intervals corresponding to the time required to advance said proofer conveyor the distance of the center to center distance between the dough supporting members thereon.

4. In combination with a dough proofer, flattener and panner for receiving dough lumps from a divider, proofing them, flattening them, sheeting them and panning them in pans of the type having individual pockets, of an endless chain cross feed conveyor having movable dough supporting members to receive dough lumps, said members being movable from a dough supporting position to a dough releasing position, said proofer including a second chain conveyor having at least one run running at right angles to and below said first-named conveyor, said second conveyor having two substantially co-extensive parallel spaced endless chains and dough supporting trays suspended between said chains, means to simultaneously move a plurality of dough supporting members of said first-named conveyor to releasing position as they pass over the trays of the second conveyor, trip means for dumping the trays of the secondary conveyor at a predetermined station, said flattener including at least one pair of continuously driven sheeting rollers positioned at said station, a horizontal dough conveyor belt positioned beneath said sheeting rollers to receive flattened dough lumps therefrom, and said panner comprising a continuously driven endless pan conveyor belt positioned to pass beneath and beyond the discharge end of said dough conveyor belt and adapted to support pans of the type having individual pockets, fingers mounted adjacent the end of said dough conveyor belt and adapted to engage the pockets of said pan and to move into a disengaging position, and a common drive means to operate said cross feed conveyor, said second chain conveyor and said fingers to move said fingers into and out of pan engaging position in time with said conveyors.

5. In combination, a proofer and dough panner, said proofer comprising an endless conveyor, dough supporting members secured thereto, means at a station along said conveyor for discharging said dough supporting members, an inclined member beneath said station for receiving the discharged dough, a movable member constructed and arranged to hold the dough on said inclined member and movable to an inoperative or dough releasing position, sheeting rollers positioned therebelow to receive dough discharged from said inclined member to flatten the same, a substantially horizontal dough conveyor belt positioned below said sheeting rollers to receive said sheeted dough, said panner comprising a second substantially horizontal conveyor beneath and extending beyond said conveyor belt to transport pans of the type having indented dough holding pockets past the delivery end of said first-named horizontal conveyor, movable fingers pivoted adjacent the discharge end of said second conveyor and movable to two positions, the first of said two positions being a pan engaging position to arrest the movement of the pans on said second-named conveyor and the second position being an inoperative position permitting pans to move with the conveyor, driving means to drive said proofer conveyor, means operated by said driving means and in timed relation therewith to move said movable member away from said inclined member to the dough releasing position, other means operated by said driving means to move said fingers into inoperative position and back to operative position to permit said pans to advance a distance to the next subsequent pocket, and different drive means to operate said sheeting rollers and said dough conveyor belt.

6. In combination, a dough proofer, flattener and panner for pans of the type having individual pockets for baking products, said dough proofer comprising an endless conveyor having vertical and horizontal runs, trays secured to said chain conveyor to support balls of dough thereon, drive means to drive said chain conveyor, said flattener comprising parallel horizontally spaced rollers positioned beneath a station on a horizontal run of said chain conveyor, means at said station to dump the trays of said chain conveyor, a trough positioned above said flattener and beneath said dumping station, a gate in said trough to simultaneously release a plurality of dough balls therefrom into said flattener, means operated by the drive means for said proofer conveyor to open and close said gate at regular intervals, said flattener being positioned beneath said gate to receive said balls of dough at regular intervals, a dough conveyor to receive said flattened balls of dough from said flattener, gate means at the end of said dough conveyor to simultaneously release said balls of dough at regular intervals, and said panner comprising pan conveying means beneath said dough conveyor, fingers operatively mounted adjacent said gate means to engage pans on said pan conveying means and arrest their movement, and means operated by the drive means for said proofer conveyor to raise said fingers clear of said pans in timed relation to the movement of said gate means, said gate means also being actuated from said proofer drive means to operate in properly timed relation to deliver dough balls to the pans.

7. In combination, a dough proofer, flattener and panner for pans of the type having individual pockets for baking products, said dough proofer comprising an endless chain conveyor having vertical and horizontal runs, trays secured to said chain conveyor to support balls of dough thereon, drive means to drive said chain conveyor, said flattener comprising parallel horizontally spaced rollers positioned at a station beneath a horizontal run on said chain conveyor, means at said station to dump the trays of said chain conveyor, a dough conveyor to receive said flattened balls of dough from said flattener, a gate at the discharge end of said dough conveyor to simultaneously release said balls of dough at regular intervals, and said panner comprising pan conveying means beneath said dough conveyor, fingers operatively mounted adjacent said gate to engage a pan on said pan conveying means and arrest its movement, and means operated by the drive means for said proofer conveyor to raise said fingers clear of said pans in timed relation to the movement of said gate whereby the arrested pan may receive balls of dough as they drop from the discharge end of said dough conveyor.

8. In a dough handling and panning machine, means to transfer dough lumps to a proofer conveyor having trays to support a plurality of dough lumps in a single line transverse to the direction of movement of said proofer conveyor, a horizontal run on said conveyor, a trip device for inverting said trays at a station on the horizontal run, a trough having a gate positioned beneath said station to receive a row of dough lumps dropped therefrom, said dough lumps dropping from said trough when said gate is operated, a continuously running endless conveyor for conveying pans of the type having individual pockets, fingers located to engage the pockets of successive rows in said pans and movable to a non-engaging position, driving means operating said proofer conveyor, cam means operated by said driving means to control the operation of said gate and the movement of said fingers so that said fingers are lifted from pan engaging position in timed relation with the opening of said gate, and means operative to transfer dough lumps dropped from said trough to a panning position at said pan conveyor whereby the operation of said gate is synchronized with the operation of said fingers engaging and controlling the advance of said pans and dough may be deposited in a pan pocket upon disengagement of said fingers from said pan pocket.

9. In combination, a dough proofer, flattener and panner for pans of the type having individual pockets for baking products, said dough proofer including an endless chain conveyor having vertical and horizontal runs, trays secured to said chain conveyor to support balls of dough thereon, drive means to drive said chain conveyor, a station along said endless chain conveyor having means to dump said trays, said flattener comprising parallel horizontally spaced rollers positioned beneath said station to pass dough lumps downward therebetween and substantially without slippage between said spaced rollers, a continuously running dough conveyor to receive said flattened balls of dough from said flattener, said dough conveyor running at a constant rate to maintain the time relation between dough dumped at said station from successive trays on said chain conveyor, and said panner comprising pan conveying means extending beneath and beyond the discharge end of said dough conveyor, fingers operatively mounted adjacent the discharge end of said dough conveyor to engage said pans and arrest their movement beneath the discharge end of said dough conveyor, and means operated by the drive means for said proofer conveyor to disengage said fingers clear of said pans in timed relation to the movement of dough through said proofer and on said dough conveyor whereby proofed dough may be automatically panned in timed relation to said proofer while said flattener and said dough conveyor maintain the timing between successive groups of dough lumps dumped at said station.

10. A dough proofing and panning machine having in combination a dough proofing conveyor passing through a proofing chamber to a subsequent dumping station, a device at said dumping station to dump dough lumps from said proofing conveyor, a guide member beneath said dumping station, a continuously running endless dough conveyor mounted beneath said guide member to receive and transport dough lumps from said dumping station, said dough conveyor being constructed and arranged to maintain the relative position of dough lumps deposited thereon, a continuously running endless conveyor mounted beneath said dough conveyor to transport dough pans having dough receiving receptacles therein, fingers movably mounted adjacent the discharge end of said dough conveyor and engaging the interior of the receptacles of the pans to arrest the movement of the pans on said continuously running pan conveyor, said fingers being movable from receptacle engaging position to receptacle releasing position, drive means operating said proofing conveyor and said fingers to move said fingers into non-receptacle engaging position in timed relation to the dumping of dough at said dumping station so that said fingers are withdrawn from the receptacles to receive dough lumps from said dough conveyor into said receptacles, and said fingers then engaging the next successive rows of receptacles in said pans.

References Cited in the file of this patent

UNITED STATES PATENTS

| | | |
|---|---|---|
| 915,010 | Young | Mar. 9, 1909 |
| 1,099,266 | Olson | June 9, 1914 |
| 1,178,674 | Pletscher | Apr. 11, 1916 |
| 1,334,024 | Embrey | Mar. 16, 1920 |
| 1,357,476 | Rogers et al. | Nov. 2, 1920 |
| 1,652,325 | Pletscher | Dec. 13, 1927 |
| 1,781,546 | Harber | Nov. 11, 1930 |
| 1,890,740 | Marasso | Dec. 13, 1932 |
| 2,342,270 | Harber | Feb. 22, 1944 |
| 2,590,823 | Rhodes | Mar. 25, 1952 |